United States Patent [19]
Louie et al.

[11] Patent Number: 5,526,690
[45] Date of Patent: Jun. 18, 1996

[54] CIRCUMFERENTIAL ACTUATOR FOR PIPING SYSTEM

[75] Inventors: Lisa L. Y. Louie, McLean, Va.; David J. Fry, North Potomac, Md.

[73] Assignee: The United States of America as represented by the Secretary of the Navy, Washington, D.C.

[21] Appl. No.: 442,751

[22] Filed: May 17, 1995

[51] Int. Cl.$^6$ .................................................. G01M 3/24
[52] U.S. Cl. ....................... 73/592; 73/40.5 A; 73/49.1; 73/49.5; 138/26
[58] Field of Search .................. 73/592, 40, 40.5 A, 73/49.1, 49.4, 49.5; 138/26, 30; 181/206

[56] References Cited

U.S. PATENT DOCUMENTS

| | | | |
|---|---|---|---|
| 3,903,729 | 9/1975 | Covington | 73/40.5 A |
| 4,750,523 | 6/1988 | Crouse | 138/30 |
| 5,197,041 | 3/1993 | Balogh | 367/160 |
| 5,452,263 | 9/1995 | Heitman | 73/40.5 A |

Primary Examiner—John E. Chapman
Attorney, Agent, or Firm—Gary G. Borda

[57] ABSTRACT

The invention is directed to a circumferential actuator for actively controlling and generating pressure waves in a piping system having a fluid or a fluid flow therein. The circumferential actuator includes a casing, a plurality of actuator units mounted in the casing for generating controlled pressure waves, a plurality of amplifiers for electronically conditioning the force generated by each of the plurality of actuator units, a controller for providing the input signals to the plurality of actuator units for controlling the phase and amplitude of the generated pressure wave, and a pressure compensating system for providing a balancing force to each actuator unit. The casing is adapted for interconnection in fluid communication with the piping system for passing the piping system flow therethrough. The plurality of actuator units are arranged axi-symmetrically around the casing. The plurality of actuators units are preferably arranged in at least 3 collocated pairs of actuators units mounted axi-symmetrically in the casing. The collocated pairs form two adjacent, axially aligned rings of actuator units. The pressure compensating system is interconnected with the plurality of actuator units and acts to provide a substantially equal pressure to each of the plurality of actuator units.

23 Claims, 6 Drawing Sheets

CIRCUMFERENTIAL ACTUATOR FOR PIPING SYSTEM

STATEMENT OF GOVERNMENT RIGHTS

The invention described herein may be manufactured and used by or for the Government of the United States of America for governmental purposes without the payment of any royalties thereon or therefor.

BACKGROUND OF THE INVENTION

1. Field of Invention

The present invention relates generally to actuator systems for generating pressure fluctuations and, more particularly, to circumferential actuator systems for actively controlling and generating pressure fluctuations in piping systems.

2. Brief Description of Related Art

Generation of precise pressure fluctuations in piping systems is desirable for a number of reasons. The ability to generate known and arbitrary pressure fluctuations is advantageous for diagnostic purposes, e.g., for determining how a piping system will respond acoustically once assembled. Also, by providing a known pressure pulse to a piping system and then measuring the pressure at a point downstream, one can determine whether the system has leaks. To actively control the fluid-borne energy, and thus the acoustic radiation, of a piping system it is necessary to produce precise pressure fluctuations. For example, to reduce downstream pressure fluctuations, it is necessary to control signal generation such that a pressure wave equal in magnitude but 180° out of phase with the incoming pressure wave is generated. Furthermore, by generating waves in a fluid filled tube, the acoustic impedance of a material immersed in the fluid may be determined.

However, presently there are no actuator systems designed specifically for use on pipes. Known actuators, such as for example J-9 actuators manufactured by Argotec, are designed to be submerged in water to operate as a sound source. Adapting known actuators for use with piping systems has produced unsatisfactory results.

Most prior art actuators are bulky with large, flat vibrating surfaces. Consequently, a number of problems arise. Present actuator systems are design to act against the total pressure (static pressure+ dynamic pressure) of the fluid in which they are submerged. To produce a satisfactory pressure wave, the actuator requires a large internally mounted inertial mass and high power to move the mass to produce vibrations at the vibrating surface. As a result, when mounted on a pipe, heavy prior art actuators (e.g., the J-9 actuator weighs over 30 lbs) create non-symmetrical structural changes to the piping system. Moreover, because the large vibrating face is flat, the actuator acts as a point source. Thus, a discontinuity in the pipe is created. Depending on the diameter of the pipe, the vibrating face of the actuator covers a different percentage of the circumference. Therefore, it is difficult, if not impossible, to supply uniform pressure fluctuations among various sized piping systems.

It is impossible to vary the amplitude and phase of generated higher order mode pressure fluctuation with a single actuator. If the diameter of the pipe is large enough, more than one prior art actuator may be mounted around the circumference and the amplitude and phase of each actuator may be controlled independently. However, there is no existing apparatus for accurately controlling the actuators as a unit to produce a desired pressure fluctuation mode. Additionally, due to size constraints, it is difficult, if not impossible, to cover a sufficient amount of the circumferential surface to allow adequate control of the generated pressure fluctuations. Furthermore, a single actuator or single axially aligned set of actuators spaced around the pipe circumference will produce a pressure wave that propagates both upstream and down stream. By traveling upstream, the pressure wave interacts and interferes with the boundary conditions of the piping system.

Presently there is no system for accurately and actively generating pressure fluctuations in piping systems. Consequently there is a need for an actuator system for actively controlling and generating pressure fluctuations.

SUMMARY OF THE INVENTION

Accordingly, it is an object of the present invention to provide an actuator for accurately generating and actively controlling pressure fluctuations in piping systems.

It is a further object of the present invention to provide a circumferential actuator for piping systems capable of reducing or cancelling acoustic radiation of piping systems.

It is a further object of the present invention to provide a circumferential actuator for piping systems capable of generating uniform plane wave as well as higher order modes in pipes.

It is still a further object of the present invention to provide a circumferential actuator for piping systems capable of generating uni-directional waves in pipes.

Other objects and advantages of the present invention will become apparent to those skilled in the art upon a reading of the following detailed description taken in conjunction with the drawings and the claims supported thereby.

In accordance with the present invention, these objects are met by providing a circumferential actuator for actively controlling and generating pressure waves in piping systems. The piping system has a fluid therein having a static pressure and a dynamic pressure associated therewith. In one embodiment of the present invention, the circumferential actuator includes: a casing having an inner surface defining an inner passage, the casing being adapted for interconnection in fluid communication with the piping system for passing the piping system fluid at the associated pressure therethrough; a plurality of actuator units arranged axisymmetrically around the casing, each of the plurality of actuator units functioning to generate a variable pressure signal wherein the variable pressure signals are transmitted to the inner passage for generating a pressure wave; and means for individually controlling the variable pressure signal generated by each of the plurality of actuator units, the controlling means providing controlled phase and amplitude input signals for controlling the phase and the amplitude of each of the variable pressure signals.

In a further embodiment of the present invention, the circumferential actuator includes a casing, a plurality of actuators mounted in the casing and a pressure compensating system for providing a balancing force to the actuator units.

The casing has an inner surface defining an inner passage and is connected at first and second ends with the piping system such that the inner passage is aligned with a flow path in the piping system. The piping system fluid enters the inner passage through the first end and exits the inner passage through the second end. The inner surface of the casing has a diameter equal to the inner diameter of the piping system adjacent the first and second ends of the casing.

The plurality of actuators units are arranged in at least 3 collocated pairs of actuators units mounted axi-symmetrically in the casing. The collocated pairs form two adjacent, axially aligned rings of actuator units. Each of the actuator units includes a vibrating surface and an outer housing defining a chamber. Each vibrating surfaces functions to generate a variable pressure signal for combining to produce the pressure wave in the piping system. Each vibrating surface is positioned proximate to the inner surface of the casing so as to be adjacent the inner passage. Each vibrating surface further has a front face facing the inner passage and a back face facing the chamber.

The pressure compensating system is interconnected with the plurality of actuator units and acts to provide a substantially equal pressure to the chamber of each of the plurality of actuator units. The pressure is transmitted through the chamber to the back face of the vibrating surface.

Additionally, the circumferential actuator may include means for controlling the variable pressure signal generated by each of the actuator units. The controlling means is capable of providing controlled phase and amplitude input signals for individually controlling the phase and amplitude of each of the variable pressure signals. Moreover, the controlling means is capable of varying individual phase and amplitude input signals as a function of the circumferential position of the actuator units.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding element throughout and wherein:

FIG. 6 is a sectional view of a preferred embodiment of an actuator unit in accordance with the present invention corresponding to actuator units shown in FIGS. 4a and 5a.

DETAILED DESCRIPTION OF THE PREFERRED EMBODIMENT

Figure 1:
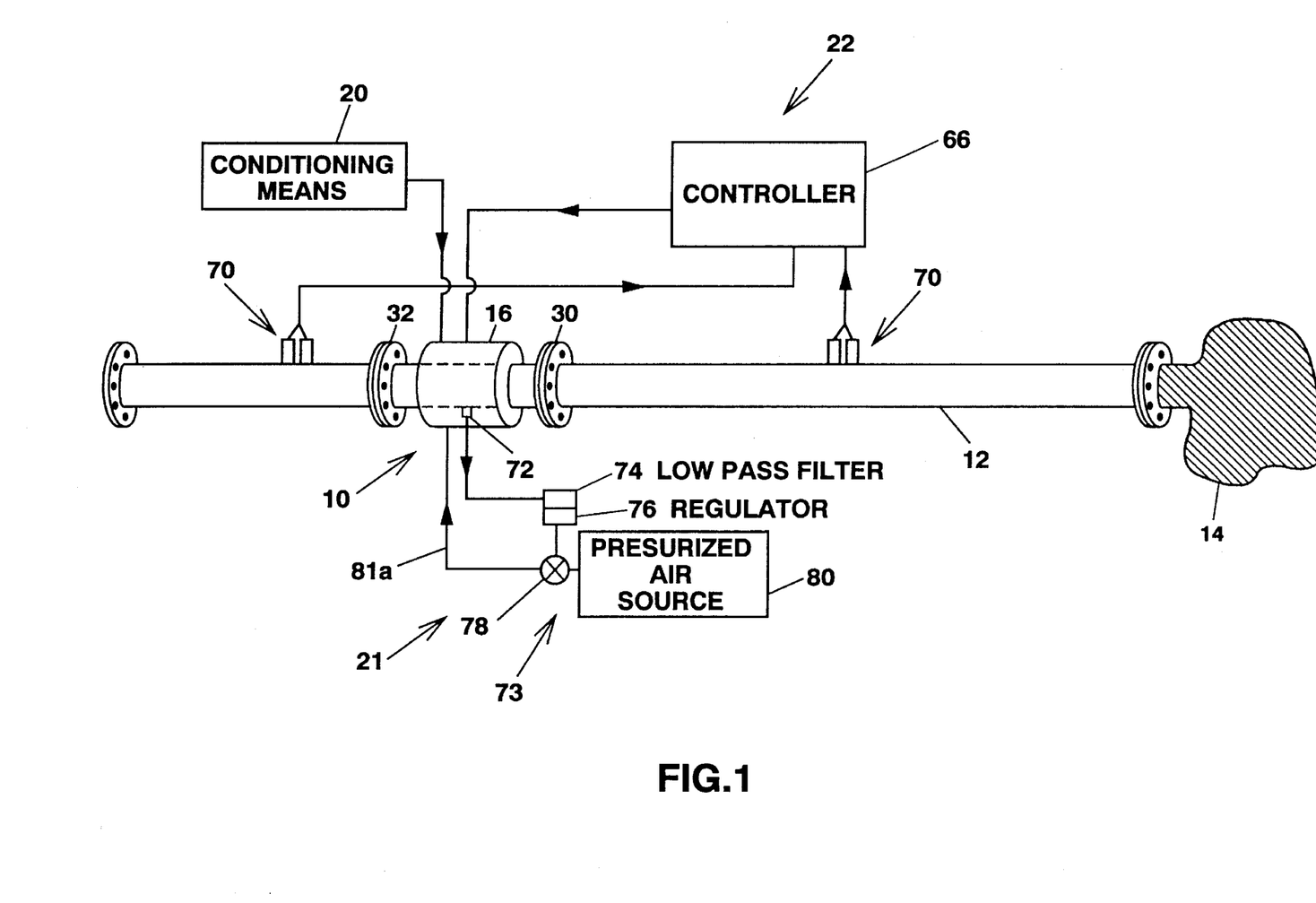
FIG. 1 is a schematic drawing of a preferred embodiment of the circumferential actuator of the present invention.

Referring now to the drawings, and particularly to FIG. 1, the circumferential actuator of the present invention for generating controllable pressure waves in piping systems is shown. Circumferential actuator 10 is shown connected in-line with piping system 12. Piping system 12 has a fluid therein. Although the fluid may be stationary, generally, the fluid will flow, either intermittently or continuously, through piping system 12. The flow may be generated, for example, by a noise source such as pump 14. The fluid has a total pressure associated therewith consisting or a static pressure and a variable dynamic pressure.

Circumferential actuator 10 in its various embodiments may include a casing 16, a plurality of actuator units 18 mounted in casing 16 for collectively generating controlled pressure waves, a plurality of conditioning means 20 for conditioning the pressure waves generated by plurality of actuator units 18, a variable pressure signal control means 22 for providing the input signals to actuator units 18 for controlling the phase and amplitude of the generated pressure wave, and a pressure compensating system 24 for providing a balancing force to each actuator unit 18.

Figure 2:
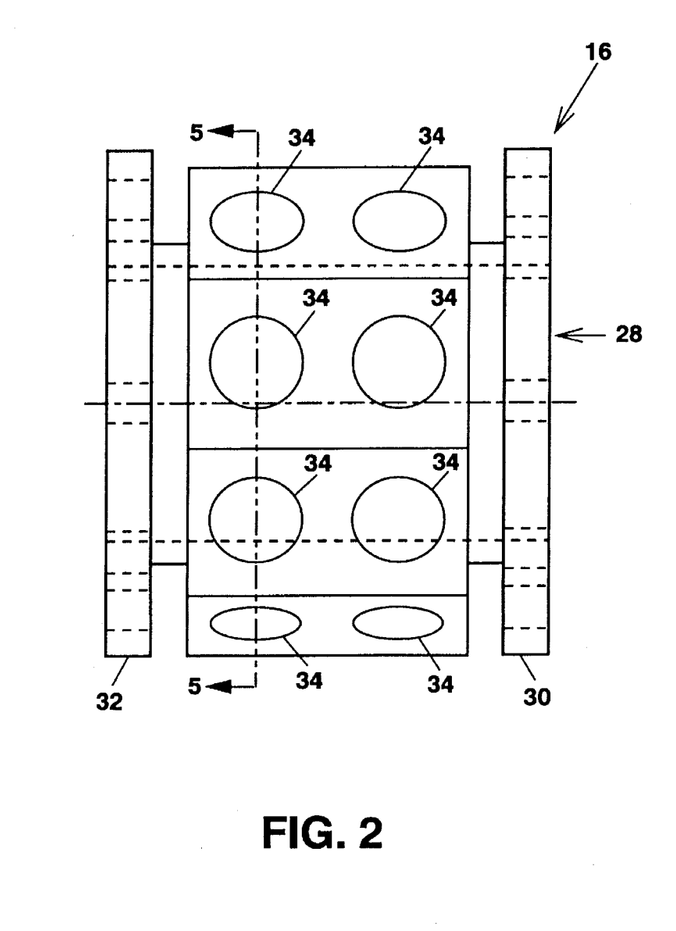
FIG. 2 is a side view of the casing of the circumferential actuator of the present invention.
Figure 3:
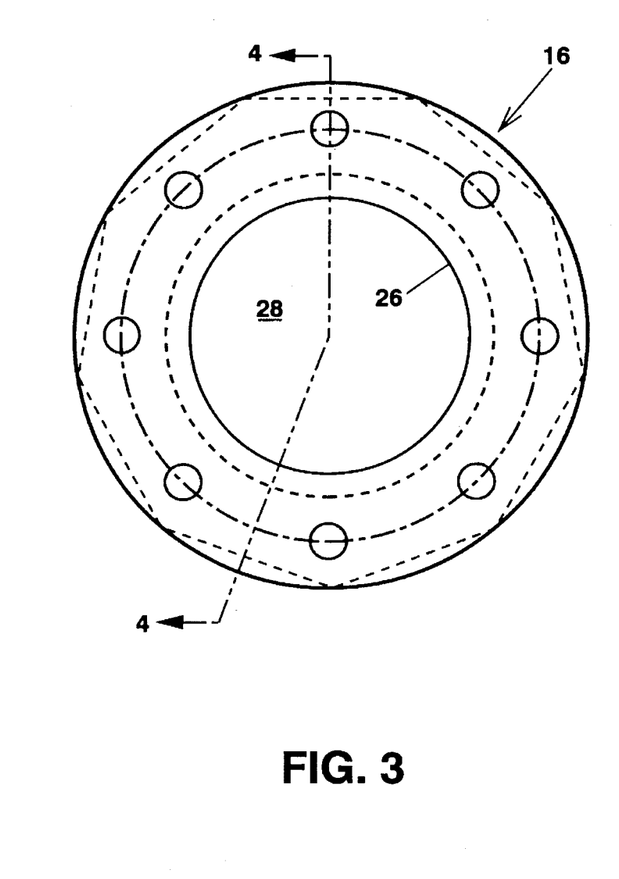
FIG. 3 is an end view of the casing of the circumferential actuator of the present invention.
Figure 4A:
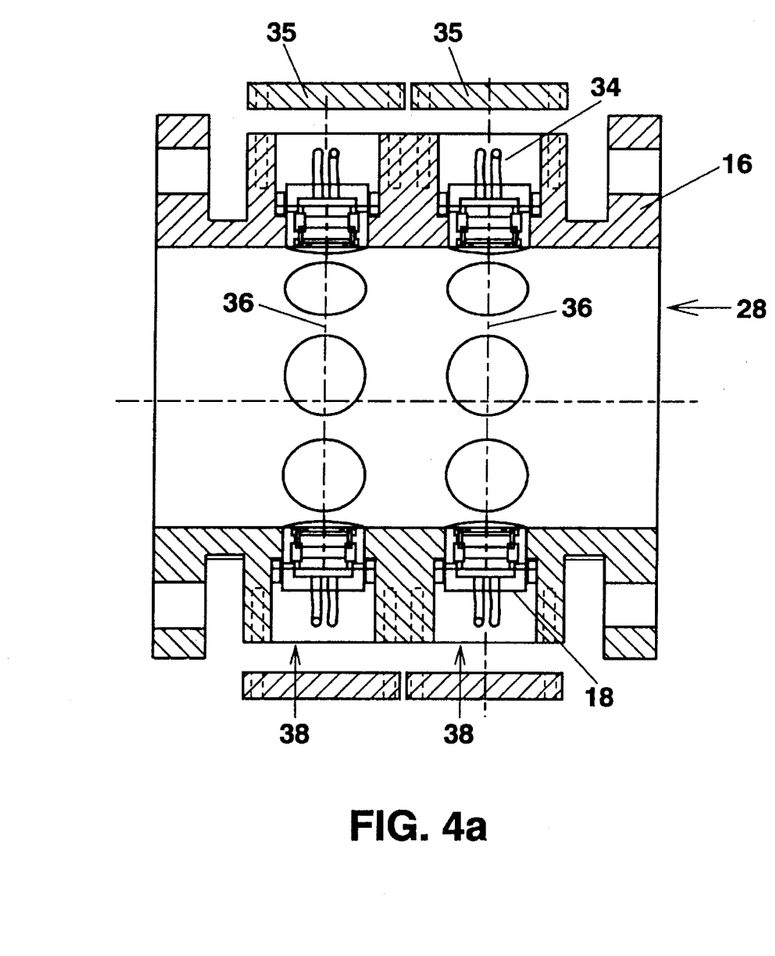
FIGS. 4a and 4b are sectional views taken along line 4—4 of FIG. 3 showing alternative embodiments of the circumferential actuator of the present invention.
Figure 4B:
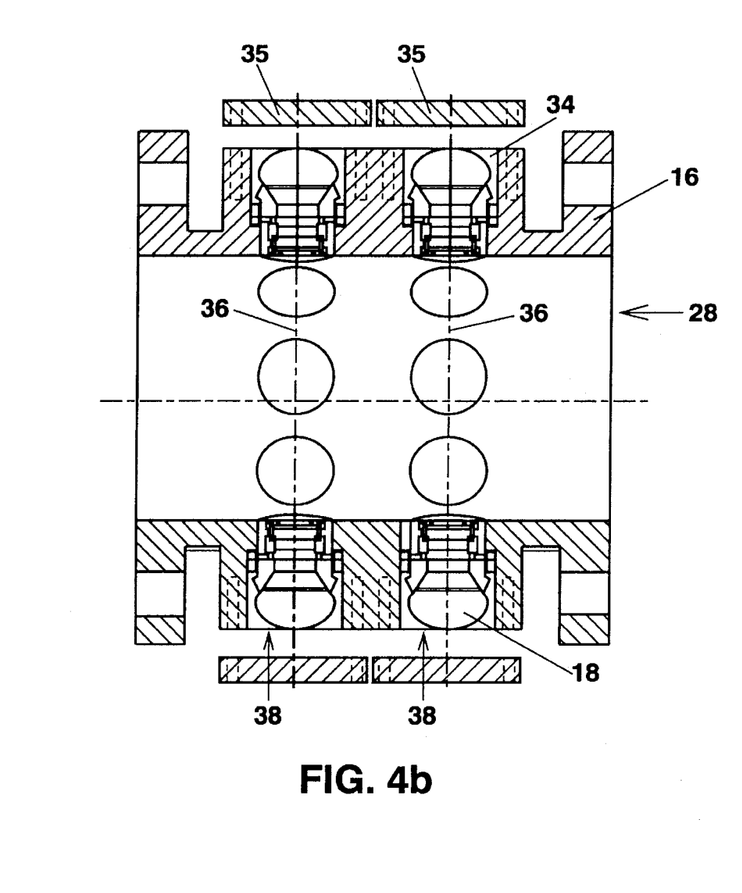

Referring to FIGS. 2 and 3, casing 16 has an inner surface 26 defining an inner passage 28. Casing 16 is adapted for being interconnected in fluid communication with piping system 12 such that a fluid flowing through piping system 12 flows uninterrupted through inner passage 28. Casing 16 is preferably a pipe shaped section for connecting in-line with piping system 12. Thus, casing 16 is connected at first end 30 and second end 32 with piping system 12 such that inner passage 28 is aligned with a fluid flow path in piping system 12. The diameter of inner surface 26 (and of inner passage 28) is equal to the inner diameter of piping system 12 adjacent first and second ends, 30 and 32, of casing 16. Fluid enters inner passage 28 through first end 30 and exits inner passage 28 through second end 32. The means for connecting casing 16 with piping system 12 may be for example a pair of flanges fixed at first and second ends of 30 and 32. Additionally, casing 16 may include a plurality of radially aligned apertures 34 therethrough for receiving plurality of actuator units 18. Casing 16 may further include aperture covers 35, as shown in FIGS. 4a and 4b, for closing apertures 34 at the outer perimeter of casing 16. Covers 35 may be attached to casing 16 in any well known fashion such as bolting or adhesion.

As depicted in FIGS. 4a, 4b, 5a and 5b, plurality of actuator units 18 are arranged axi-symmetrically around the circumference of casing 16. Preferably, plurality of actuator units 18 are mounted in plurality of apertures 34 in casing 16. Each actuator unit 18 functions to generate a variable output pressure signal. The sum of the individual output pressure signals produce a variable pressure wave in the fluid in or flowing through inner passage 28. Generally, plurality of actuator units 18 have a common circumferential centerline 36 and are, thus, axially aligned in casing 16. Plurality of actuator units 18 at centerline 36 circumscribe at least 50% of the periphery of inner passage 28 and preferably circumscribe at least 70% of the periphery of inner passage 28.

Figure 6:
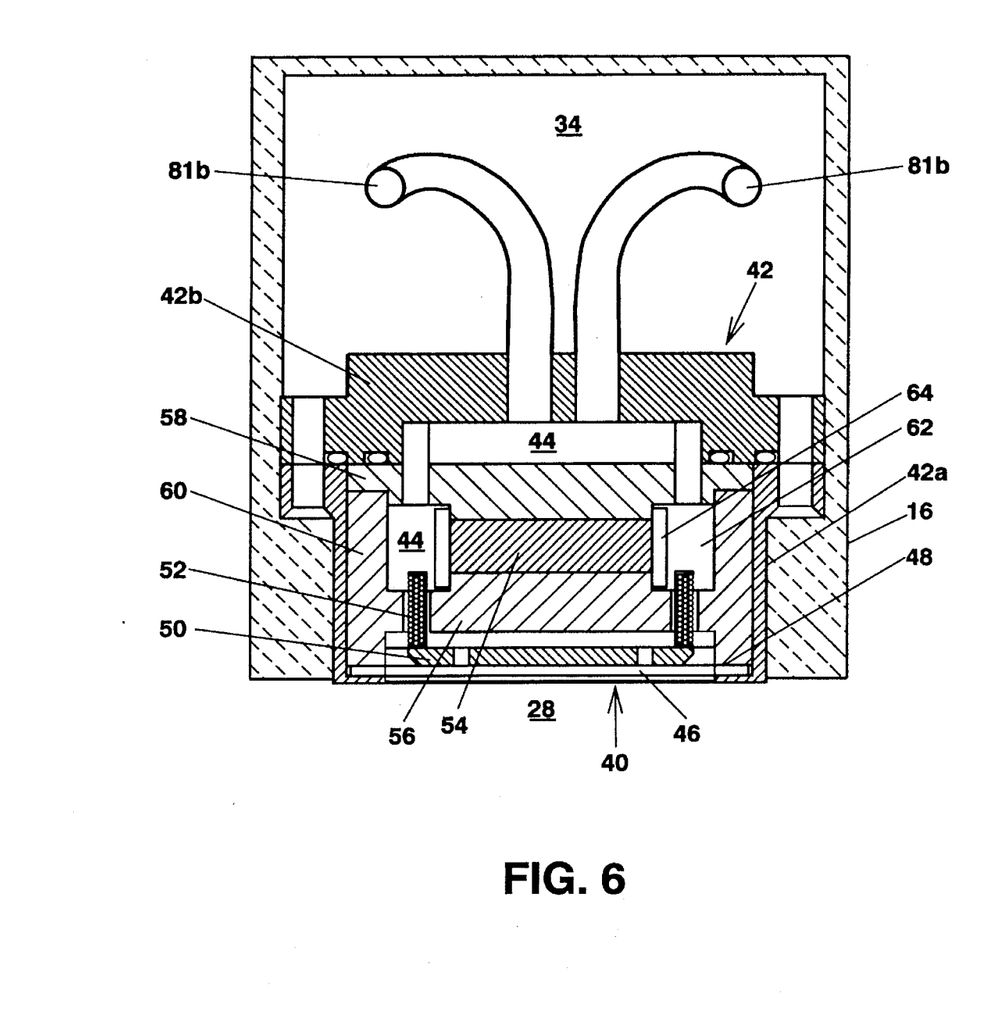

In the preferred embodiments of circumferential actuator 10 shown in FIGS. 4a, 4b and 6, plurality of actuators units 18 are arranged as a plurality of circumferentially spaced collocated pairs of actuators units. The plurality of collocated pairs of actuator units form two axially aligned, adjacent rings 38 of actuator units 18. The plurality of pairs of actuators units 18 preferably includes at least 3 pairs of actuator units 18 and will in general include between 3 and 12 pairs of actuator units 18. Each ring 38 has a common circumferential centerline 36. Each ring 38 at centerline 36 circumscribes at least 50% of the periphery of inner passage 28 and preferably circumscribes at least 70% of the periphery of inner passage 28. Rings 38 are arranged in closely spaced proximity and preferably the axial spacing between rings 38 is as small as possible, e.g., less than about twice the maximum axial dimension of aperture 34.

Actuator units 18 may be any well known type of actuator unit for producing controlled vibrations, for example, electro-magnetic actuators and piezoelectric actuators. Each actuator unit 18 includes a vibrating surface 40 and an outer housing 42. Vibrating surface 40 and outer housing 42 define a chamber 44. When actuator units 18 are installed in circumferential actuator 10, vibrating surfaces 40 are positioned proximate to inner surface 26, either coincident with or slightly indented from inner surface 26, so as to be adjacent inner passage 28. Vibrating surface 40 includes a front face 46 facing inner passage 28 and a back face 48 facing chamber 44. Vibrating surface 40 functions to transmit a variable output pressure signal to inner passage 28 for generating a pressure wave in the fluid within inner passage 28.

Figure 7:
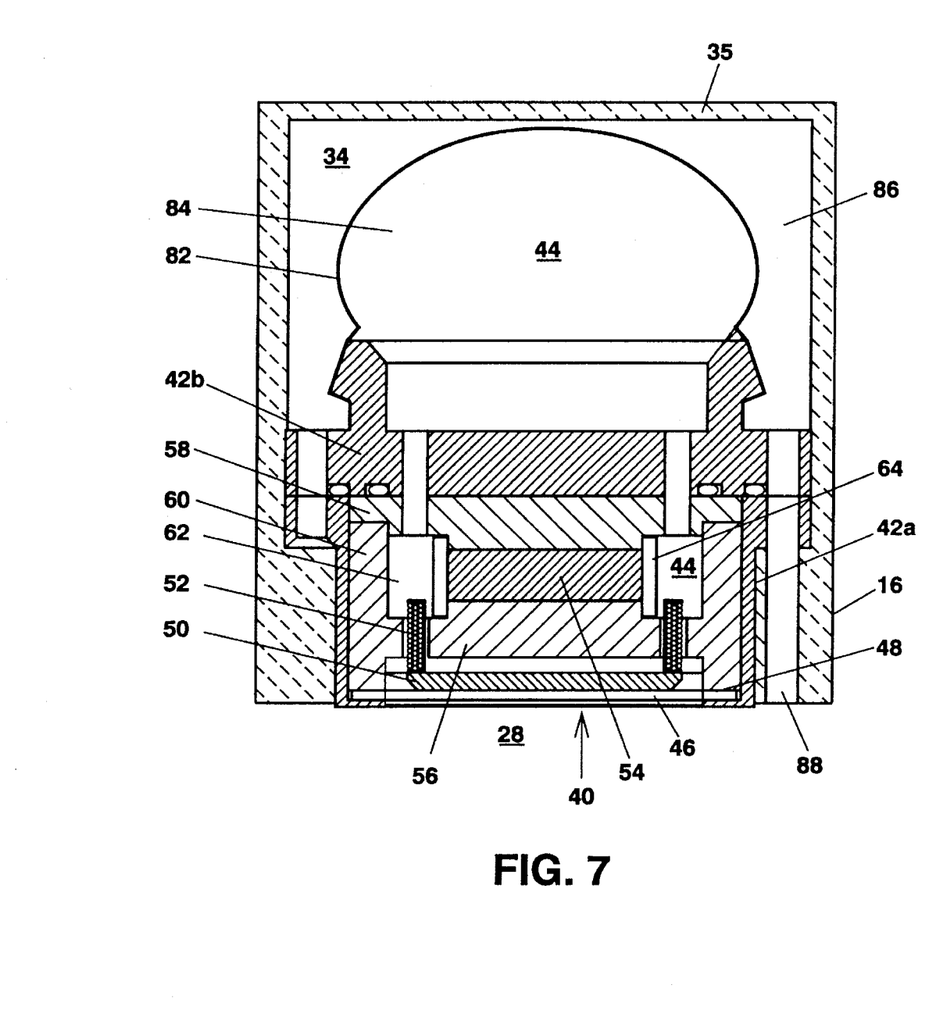
FIG. 7 is a sectional view of an alternative preferred embodiment of an actuator unit in accordance with the present invention corresponding to actuator units shown in FIGS. 4b and 5b.

In a preferred embodiment, actuator units 18 are electromagnetic actuators. As shown in FIGS. 6 and 7, electromagnetic actuators 18 preferably include vibrating diaphragm 40 and outer housing 42 defining chamber 44. For ease of assembly, outer housing 42 includes upper housing 42a and lower housing 42b. Diaphragm 40 includes front face 46 facing inner passage 28 and back face 48 facing chamber 44. A radially movable bobbin 50 is connected, preferably by a compatible adhesive, to back face 48 of diaphragm 40 and projects into chamber 44. An electric coil 52 is formed around bobbin 50 and is connected to any well known power source for charging electric coil 52 for generating a controlled electro-magnetic field in response to a controlled voltage input. A magnet 54 is mounted within chamber 44 proximate to and in radially spaced alignment with bobbin 50. Magnet 54 is surrounded by a magnetizable metallic material structure which is coupled to casing 16 and which acts as a magnetic pole for containing the electro-magnetic field generated by electric coil 52. The magnetizable material structure includes an upper magnetic pole piece 56, a lower magnetic pole piece 58 and a lateral or middle magnetic pole piece 60. Vibrating diaphragm 40 is attached, preferably by a compatible adhesive, to middle magnetic pole piece 60. Magnet 54 is sandwiched between upper and lower magnetic pole pieces, 56 and 58, and is surrounded by middle magnetic pole piece 60. Middle magnetic pole piece 60 defines an annular space 62 in chamber 44 between magnet 54 and middle magnetic pole piece 60 wherein bobbin 50 and electric coil 52 project into annular space 62. An alignment ring 64 may be included for aligning magnet 54 and the upper and lower magnetic pole pieces, 56 and 58, wherein alignment ring 64 forms a tight fit with magnet 54 and upper and lower magnetic pole pieces, 56 and 58.

Each actuator unit 18 may further include conditioning means 20 for conditioning the variable output pressure signal generated by the unit such that substantially identical output pressure signals are generated by each actuator unit 18 in response to substantially identical input signals from variable pressure signal control means 22. Because individual actuator units 18 may have small geometric differences in the structure responsible for generating the pressure wave (especially the coils and magnets of electro-magnetic actuators), output pressure signals generated by individual actuator units 18 in response to identical input signals from control means 22 may differ slightly from unit to unit. Therefore, during assembly and calibration of circumferential actuator 10, a conditioning means 20 is coupled with each individual actuator unit 18. Conditioning means 20 may be physically attached to actuator unit 18 or may be distant but electronically coupled with actuator unit 18. Conditioning means 20 comprises pre-calibrated electronic circuitry for correlating the amplitude and phase of output pressure signals of plurality of actuator units 18 by electronic compensation. Conditioning means 20 includes an amplifier and/or signal conditioner electrically connected between control means 22 and each actuator unit 18 to modify or condition the output pressure signal of each actuator unit 18 by adjusting the input signals from control means 22 before it reaches individual actuator units. Conditioning means 20 is individually designed for each actuator unit 18 so that output pressure signals from each actuator unit 18 in response to known input signals from control means 22 are substantially identical. By ensuring identical output from identical input, conditioning means 20 provides circumferential actuator 10 with the ability to precisely and accurately control generated pressure waves. Alternatively, to produce identical output pressure signal from each actuator unit 18, individual control means 22 may be associated with each actuator unit to individually control the input to each unit. However, a single control means 22 and a plurality of conditioning means 20 (one conditioning means per actuator unit) for controlling the output of the plurality of actuator units 18 is preferred.

Circumferential actuator 10 may further include variable pressure signal control means 22, shown in FIG. 1, for individually and/or collectively controlling output pressure signals generated by each actuator unit 18. Control means 22 provides precise phase and amplitude input signals to each individual actuator unit 18 for controlling the phase and amplitude of output pressure signals generated by the individual actuator units. Control means 22 is capable of varying the phase and amplitude input signals as a function of the circumferential position of each actuator unit 18. Control means 22 may include a controller 66, such as a computer, for generating and transmitting desired phase and amplitude input signals to actuator units 18.

In a preferred embodiment, control means 22 also includes a means for determining the pressure in inner passage 28, for generating pressure data corresponding thereto and for transmitting the pressure data to controller 66. Controller 66 receives the pressure data, generates the desired phase and amplitude input signals based on the received pressure data, and controllably transmits the phase and amplitude input signals (e.g., as a function of circumferential position of individual actuator units) to actuator units 18. Actuator units 18 will respond with controlled vibrations of vibrating surfaces 40 to produce controlled pressure waves in piping system 12. The means for determining the pressure in inner passage 28 and for generating pressure data may be, for example, a hydrophone, pressure sensor and/or pressure transducer 70 mounted in inner surface 26 of casing 16 and capable of measuring fluid pressure fluctuations and/or fluid borne noise. Pressure determining means 70 may be located upstream of circumferential actuator 10 (i.e., between circumferential actuator 10 and noise source 14) or may be located both upstream and downstream of circumferential actuator 10. The upstream sensor will act as a reference sensor to determine pressure data originating from noise source 14. The downstream sensor will act as an error sensor in a feed-back loop to check if pressure data resulting from operation of circumferential actuator 10 matches the desired result whereby controller 66 can adjust the phase and amplitude input signals transmitted to actuator units 18 accordingly.

Preferably, pressure transducer 70 and controller 66 are used to determine the phase and amplitude of the dynamic pressure in inner passage 28. Controller 66 then transmits phase and amplitude input signal based on the dynamic pressure to each actuator unit 18. When actuator unit 18 is an electro-magnetic actuator, controller 66 functions to transmit a voltage signal representing the controlled phase and amplitude input signals to electric coil 52. Active control methods and apparatus for generating controlled electric signals such as phase and amplitude controlled electric signals are well known in the art and will not be described in detail herein.

Circumferential actuator 10 may further include pressure compensating system 24 interconnected with plurality of actuator units 18. Pressure compensating system 24 provides a substantially equal pressure to chamber 44 of each actuator unit 18 wherein the pressure is transmitted to back face 48 of vibrating surface 40. The pressure provided by pressure compensating system 24 acts as a balancing force for preloading vibrating surface 40. Preferably the pressure provided by pressure compensating system 24 is substantially equal to the static pressure in inner passage 28 acting on front face 46 of vibrating surface 40 of each actuator unit 18. Thus, if cancellation of pressure variations in the flow is desired, circumferential actuator 10 need only generate vibrational forces over vibrating surface 40 sufficient to generate pressure waves on the order of the dynamic pressure in piping system 12. Conventional prior art actuators for generating pressure waves in heavy fluids such as water must act against the total pressure of the fluid (i.e., static pressure+ dynamic pressure) and thus require a large inertial mass and high power for vibrating the inertial mass. However, because circumferential actuator 10 need only act against the dynamic pressure of piping system 12, actuator units 18 may be much smaller than prior art actuators and may operate using much lower power than do prior art actuators.

In one preferred embodiment represented in FIGS. 1, 4a, 5a and 6, pressure compensating system 24 includes pressure sensing means 72, regulating means 73, and at least one pressurized air source 80 in flow communication with chamber 44 of each actuator unit 18 to provide a substantially equal pressure to plurality of actuator units 18. Pressure sensing means 72 preferably includes at least one pressure sensor or transducer capable of measuring fluid pressures. Pressure sensing means 72 determines the total pressure in inner passage 28 acting on vibrating surface 40 of each actuator unit 18 and generates a signal corresponding thereto. Regulating means 73 is located between pressurized air source 80 and plurality of actuator units 18 and receives the total pressure signal from pressure sensing means 72. Regulating means 73 preferably includes at least one low pass filter 74, at least one regulator 76, and at least one valve 78. In such a case, low pass filter 74 receives the total pressure signal and determines the static pressure in inner passage 28 by isolating the static pressure from the total pressure and then transmits a signal corresponding to the static pressure to regulator 76. Valve 78 is positioned between pressurized air source 80 and plurality of actuator units 18 and is responsive to regulator 76. Low pass filters are well known in the art and will not be described in detail herein. Regulator 76 and valve 78 may be any well known regulator/valve apparatus for regulating fluid flow such as, for example, regulators for controlling flow from pressurized tanks such as scuba tanks. Regulator 76 opens valve 78 in response to pressure signals from pressure sensing means 72 as filtered by low pass filter 74 to provide substantially equal pressure from pressurized air source 80 to plurality of actuator units 18 through pressure line 81a and actuator supply lines 81b. As a result, pressure substantially equal to the static pressure in inner passage 28 is supplied to chamber 44 of each actuator unit 18.

Figure 5A:
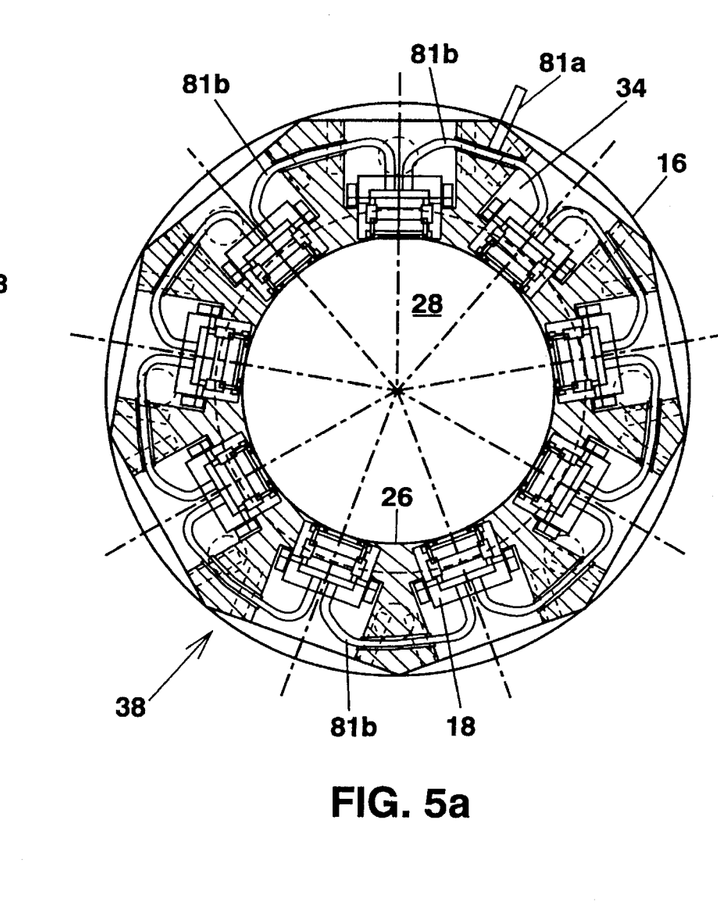
FIGS. 5a and 5b are sectional views taken along line 5—5 of FIG. 2 showing alternative embodiments of the circumferential actuator of the present invention.
Figure 5B:
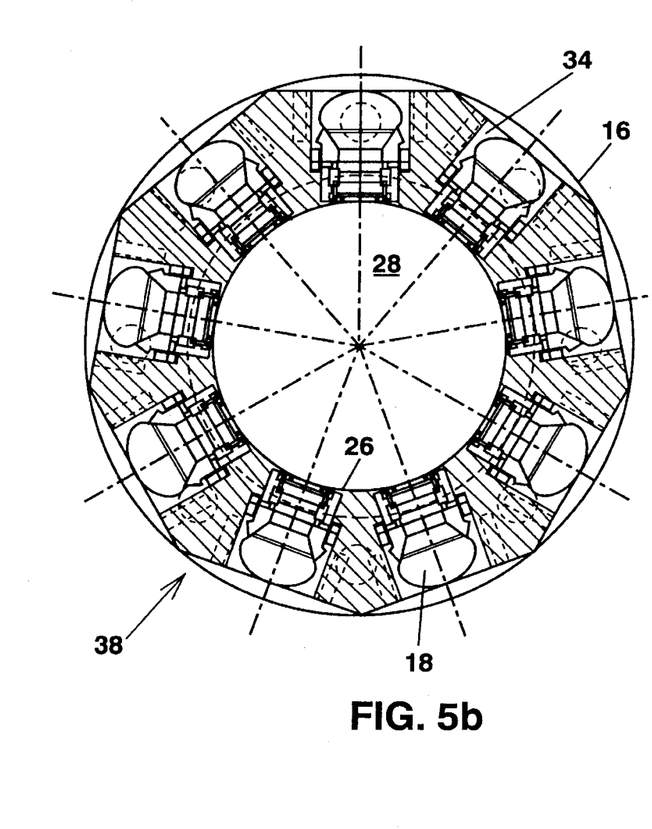

In an alternative preferred embodiment of pressure compensating system 24 as represented in FIGS. 4b, 5b and 7, each actuator unit 18 includes a flexible diaphragm 82 forming an air filled compartment 84 in chamber 44 between vibrating surface 40 and flexible diaphragm 82 and a water filled compartment 86 in aperture 34 between flexible diaphragm 82 and aperture cover 35. Alternatively, water filled compartment 86 may be formed in chamber 44 between flexible diaphragm 82 and side and back walls of housing 42. Pressure compensating system 24 includes at least one compensation tube 88 that interconnects inner passage 28 with water filled compartment 86 of each actuator unit 18. Inner passage 28 and water filled compartments 86 may be interconnected in a manner similar to the interconnection of pressure source 80 and chambers 44 of the previously described embodiment. Alternatively, as shown in FIG. 7, a plurality of compensation tubes 88 may be provided such that a compensation tube 88 is associated with each actuator unit 18 for connecting inner passage 28 with water filled compartment 86. The diameter and length (i.e., the internal volume) of compensation tube 88 is sized such that pressure compensating system 24 functions as a low pass filter for transmitting a portion of the fluid from inner passage 28 at the static pressure in inner passage 28 to water filled compartment 86 of each actuator unit 18. A compensation tube too large in volume will transmit the total pressure (static pressure+ dynamic pressure), while a compensation tube that is too small in volume will take a very long time to account for any change in static pressure. The sizing of compensation tube 88 is well within the skill of the art and will not be detailed herein. The static pressure transmitted to water filled compartment 86 acts through flexible diaphragm 82 to transmit the static pressure to air filled compartment 84 where it acts on back face 48 of vibrating surface 40.

In operation, circumferential actuator 10 is capable of actively controlling pressure fluctuations provided to piping system 12. Each individual actuator unit 18 is independently controlled by control means 22, thus, the phase and amplitude of output pressure signals generated by individual actuator units 18 may be varied as a function of circumferential location. As a result, the phase and amplitude of the resulting pressure wave may be accurately controlled. Additionally, circumferential actuator 10 is capable of generating plane waves as well as waves of higher order modes. The optimal number of actuator units is determined, based on the number of modes circumferential actuator 10 is required to generate, by multiplying the number of modes desired by the spatial Nyquist factor. Furthermore, by arranging plurality of actuator units 18 into adjacent rings 38, circumferential actuator 10 is capable as acting as a dipole to produce uni-directional waves, e.g., waves propagating downstream only. To generate a uni-directional wave, the pressure waves generated by each ring 38 must be phased such that the output of the first ring differs from the output of the second ring by a factor proportional to 180° plus the distance between actuators divided by the speed of sound in the medium, i.e.:

$$m_1(t) = -m_2(t - b/b_0)$$

where $m_1$ and $m_2$ are the output at the first and second rings, respectively, t is time, b is the distance between rings, and $c_o$ is the speed of sound in the medium.

Accordingly, circumferential actuator 10 may be used for system diagnostics as well as for reducing flow noise by reducing or eliminating system vibrations. By providing a known pressure wave in piping system 12, one may, for example, determine the response of piping system 12 to known pressure fluctuations or may determine if leaks are present in the system. Moreover, by determining the amplitude and phase of the dynamic pressure fluctuations in piping system 12, circumferential actuator 10 may generate pressure waves necessary to cancel downstream fluctuations.

The advantages of the present invention are numerous. Because the vibrating surface of the circumferential actuator circumscribes a large percentage of the circumference of the flow passage, the circumferential actuator does not act as a point source, but generates a uniform signal into the pipe. By following the curvature of the flow passage, the direction of actuation will be ideal, i.e., radially inward equally around the circumference of the flow passage. Furthermore, the flow in the piping system will not experience any discontinuities due to change in pipe geometry. By varying the amplitude and phase as a function of the circumferential position of individual actuator units, the circumferential actuator is capable of generating uniform plane wave as well as higher order modes in piping systems. By providing two collocated actuator rings, the present invention is capable of producing uni-directional waves, i.e., waves propagating downstream only. The static pressure compensation system of the present invention, which acts in a fashion analogous to that of a low pass filter, allows small actuator units requiring low power to vibrate small inertial masses to generate a high level of dynamic pressure in piping systems. That is, because no large inertial mass is required, the present invention has a high generated force-to-actuator weight ratio. Furthermore, by conditioning individual actuator unit output pressure signals using magnitude and phase matching electronics, the individual actuator units work together for optimal signal generation. Additionally, the optimal number of individual actuator units may be determined analytically based on the number of modes that the circumferential actuator is required to generate.

The present invention and many of its attendant advantages will be understood from the foregoing description and it will be apparent to those skilled in the art to which the invention relates that various modifications may be made in the form, construction and arrangement of the elements of the invention described herein without departing from the spirit and scope of the invention or sacrificing all of its material advantages. The forms of the present invention herein described are not intended to be limiting but are merely preferred or exemplary embodiments thereof.

What is claimed is:

1. A circumferential actuator for a piping system, the piping system having a fluid therein wherein the fluid has a static pressure and a dynamic pressure associated therewith, said actuator comprising:

a casing having an inner surface defining an inner passage, said casing adapted for being interconnected in fluid communication with the piping system for passing the piping system fluid at the associated pressure therethrough;

a plurality of actuator units arranged axi-symmetrically around said casing, each of said plurality of actuator units functioning to generate a variable pressure signal wherein said variable pressure signal is transmitted to said inner passage; and means for individually controlling said variable pressure signal generated by each of said plurality of actuator units, said controlling means providing controlled phase and amplitude input signals for controlling a phase and an amplitude of each of said variable pressure signals.

2. A circumferential actuator as in claim 1 wherein said casing includes a plurality of radially aligned apertures therethrough, said plurality of actuator units being mounted in said plurality of apertures.

3. A circumferential actuator as in claim 1 wherein said plurality of actuator units have a common circumferential centerline, said plurality of actuator units at said centerline circumscribing at least 50% of a periphery of said inner passage.

4. A circumferential actuator as in claim 1 wherein said plurality of actuators units comprises a plurality of circumferentially spaced collocated pairs of actuators units, said collocated pairs forming two adjacent rings of actuator units.

5. A circumferential actuator as in claim 4 wherein each of said rings have a common circumferential centerline, each of said rings at said centerline circumscribing at least 50% of a periphery of said inner passage.

6. A circumferential actuator as in claim 1 wherein each of said plurality of actuators further comprises means for conditioning said variable pressure signal such that substantially identical pressure signals are generated by each of said plurality of actuator units in response to substantially identical input signals from said controlling means.

7. A circumferential actuator as in claim 1 wherein each of said plurality of actuator units includes a vibrating surface and an outer housing defining a chamber, said vibrating surface positioned proximate said inner surface of said casing so as to be adjacent said inner passage, said vibrating surface having a front face facing said inner passage and a back face facing said chamber, said vibrating surface functioning to transmit said variable pressure signal to said inner passage.

8. A circumferential actuator as in claim 7 further comprising a pressure compensating system interconnected with said plurality of actuator units, said pressure compensating system functioning to provide a substantially equal pressure to said chamber of each of said plurality of actuator units wherein said pressure is transmitted to said back face of said vibrating surface.

9. A circumferential actuator as in claim 8 wherein said pressure is substantially equal to the static pressure in said inner passage acting on said vibrating surface of each of said plurality of actuator units.

10. A circumferential actuator as in claim 1 wherein said controlling means includes a means for determining a phase and an amplitude of the dynamic pressure in said inner passage and for generating dynamic pressure data corresponding thereto and a controller for receiving said dynamic pressure data, said controller generating said controlled phase and amplitude input signals based on said dynamic pressure data.

11. A circumferential actuator for generating pressure waves in a piping system, the piping system having a fluid therein wherein the fluid has a total pressure associated therewith, the total pressure including a static pressure and a dynamic pressure, said actuator comprising:

a casing having an inner surface defining an inner passage, said casing connected at first and second ends with the piping system such that said inner passage is aligned with a flow path in the piping system, said inner surface having a diameter equal to an inner diameter of the piping system adjacent said first and second ends;

a plurality of actuators units, said plurality of actuator units forming at least 3 collocated pairs of actuators units mounted axi-symmetrically in said casing, said collocated pairs forming two adjacent rings of actuator units, each of said plurality of actuator units including a vibrating surface and an outer housing defining a chamber, said vibrating surface positioned proximate said inner surface of said casing so as to be adjacent said inner passage, said vibrating surface having a front face facing said inner passage and a back face facing said chamber, said vibrating surface functioning to generate a variable pressure signal; and a pressure compensating system interconnected with said plurality of actuator units, said pressure compensating system providing a substantially equal pressure to said chamber of each of said plurality of actuator units wherein said pressure is transmitted to said back face of said vibrating surface.

12. A circumferential actuator as in claim 11 wherein each of said rings have a common circumferential centerline, each of said rings at said centerline circumscribing at least 50% of a periphery of said inner passage.

13. A circumferential actuator as in claim 12 wherein each of said rings at said centerline circumscribe at least 70% of a periphery of said inner passage.

14. A circumferential actuator as in claim 11 further comprising means for controlling said variable pressure signal generated by each of said plurality of actuator units, said controlling means providing controlled phase and amplitude input signals for controlling a phase and an amplitude of each of said variable pressure signals wherein said controlling means is capable of varying said phase and amplitude input signals as a function of a circumferential position of said plurality of actuators.

15. A circumferential actuator as in claim 14 wherein each of said plurality of actuators further comprises means for conditioning said variable pressure signal such that substantially identical pressure signals are generated by each of said plurality of actuator units in response to substantially identical input signals from said controlling means.

16. A circumferential actuator as in claim 11 wherein said plurality of actuator units are piezoelectric actuators.

17. A circumferential actuator as in claim 11 wherein said plurality of actuator units are electro-magnetic actuators.

18. A circumferential actuator as in claim 17 wherein each of said electro-magnetic actuators comprise:

a diaphragm and an outer housing defining a chamber, said diaphragm having a front face facing said inner passage and a back face facing said chamber;

a radially movable bobbin connected to said back face of said diaphragm and projecting into said chamber;

an electric coil formed around said bobbin for generating a controlled magnetic field; and a magnet mounted proximate to and in radially spaced alignment with said bobbin, said magnet being surrounded by a magnetizable material that acts as a magnetic pole to contain said magnetic field.

19. A circumferential actuator as in claim 18 wherein said magnetizable material includes an upper magnetic pole piece, a lower magnetic pole piece and a middle magnetic pole piece, said magnet being sandwiched between said upper and a lower magnetic pole piece and being laterally surrounded by said middle magnetic pole piece, said middle magnetic pole piece defining an annular space between said magnet and said middle magnetic pole piece, said bobbin and electric coil projecting into said annular space.

20. A circumferential actuator as in claim 18 further comprising means for controlling said variable pressure signal generated by each of said plurality of actuator units, said controlling means providing controlled phase and amplitude input signals for controlling a phase and an amplitude of each of said variable pressure signals, said controlling means generating said controlled phase and amplitude input signals in the form of voltage signals, said controlling means transmitting said voltage signals to said electric coils of said plurality of actuator units.

21. A circumferential actuator as in claim 20 wherein said controlling means further comprises a means for determining a phase and an amplitude of a pressure in said inner passage and for generating pressure data corresponding thereto and a controller for receiving said pressure data and for generating said controlled phase and amplitude input signals in response to said pressure data.

22. A circumferential actuator as in claim 11 wherein said pressure compensating system includes at least one pressure sensing means for sensing the total pressure in said inner passage and for generating a signal corresponding thereto, a pressurized air source for providing said substantially equal pressure to said plurality of actuator units, and a regulating means positioned between said pressurized air source and said plurality of actuator units for regulating said substantially equal pressure wherein said regulating means receives said signal from said sensing means and further wherein said regulating means includes a means for determine the static pressure in said inner passage from said signal whereby in response to said signal from said pressure sensing means said regulating means enables said pressurized air source to provide said substantially equal pressure to said plurality of actuator units and further wherein said pressure is substantially equal to the static pressure in said inner passage.

23. A circumferential actuator as in claim 11 wherein each of said plurality of actuator units includes a flexible diaphragm forming an air filled compartment in said chamber between said vibrating surface and said flexible diaphragm and a water filled compartment in said aperture between said flexible diaphragm and an aperture cover connected to said casing for closing said aperture, and wherein said pressure compensating system includes a compensation tube connecting said inner passage with said water filled compartment of each of said plurality of apertures wherein a diameter and a length of said compensation tube are sized such that said pressure compensating system functions as a low pass filter for transmitting a portion of the fluid at the static pressure in said inner passage to said water filled compartment of said plurality of actuator units.

\* \* \* \* \*